(12) United States Patent
Schultink et al.

(10) Patent No.: US 6,372,004 B1
(45) Date of Patent: Apr. 16, 2002

(54) HIGH EFFICIENCY DEPTH FILTER AND METHODS OF FORMING THE SAME

(75) Inventors: Jan Schultink, Eksel; Bas Schultink, Overpelt, both of (BE)

(73) Assignee: Airflo Europe N.V. (BE)

(*) Notice: Subject to any disclaimer, the term of this patent is extended or adjusted under 35 U.S.C. 154(b) by 0 days.

(21) Appl. No.: 09/372,496

(22) Filed: Aug. 11, 1999

Related U.S. Application Data

(60) Provisional application No. 60/142,877, filed on Jul. 8, 1999.

(51) Int. Cl.[7] .............................................. B01D 29/11
(52) U.S. Cl. ............................. 55/382; 15/347; 55/485; 55/486; 55/487; 55/528; 55/DIG. 2; 55/DIG. 5; 96/66; 96/68; 264/258; 264/DIG. 48; 442/389
(58) Field of Search ............................ 95/57, 78, 286, 95/287, 273; 96/15, 65, 66, 68, 69; 55/382, 528, 485–487, DIG. 2, DIG. 3, DIG. 5, DIG. 39; 428/340, 903; 442/389; 15/347, 352; 264/257, 258, DIG. 48

(56) References Cited

U.S. PATENT DOCUMENTS

| | | |
|---|---|---|
| 1,821,824 A | 9/1931 | Woodward |
| 2,732,911 A | 1/1956 | Gall ............................. 183/51 |
| 2,804,166 A | 8/1957 | Stevens et al. ................ 183/49 |
| 2,813,596 A | 11/1957 | Voigtman et al. .............. 183/69 |
| 3,370,406 A | 2/1968 | Fesco ........................... 55/377 |
| 3,774,375 A | 11/1973 | Smith ....................... 55/528 X |
| 3,971,373 A | 7/1976 | Braun ....................... 128/146.2 |
| 4,011,067 A | 3/1977 | Carey, Jr. ................. 55/528 X |
| 4,116,648 A | 9/1978 | Busch .......................... 55/276 |
| 4,164,400 A | 8/1979 | Wald ............................ 55/382 |
| 4,215,682 A | 8/1980 | Kubik et al. ........... 128/205.29 |
| 4,257,791 A | 3/1981 | Wald ............................ 55/382 |
| 4,375,718 A | 3/1983 | Wadsworth et al. ....... 29/592 E |
| 4,429,001 A | 1/1984 | Kolpin et al. ............... 428/283 |
| 4,589,894 A | 5/1986 | Gin et al. ...................... 55/274 |
| 4,592,815 A | 6/1986 | Nakao ......................... 204/165 |
| 4,714,647 A | 12/1987 | Shipp, Jr. et al. ......... 55/487 X |

(List continued on next page.)

FOREIGN PATENT DOCUMENTS

| | | |
|---|---|---|
| DE | 195 44 790 A1 | 6/1997 |
| DE | 196 06 718 A1 | 8/1997 |
| EP | 0 338 479 A1 | 10/1989 |
| EP | 0 161 790 B1 | 2/1990 |
| EP | 0 375 234 A1 | 6/1990 |
| EP | 0 477 007 A1 | 3/1992 |
| EP | 0 582 286 A1 | 2/1994 |
| EP | 0 639 061 A1 | 5/1997 |
| WO | WO 97/30772 | 8/1997 |
| WO | WO 98/11282 | 3/1998 |

OTHER PUBLICATIONS

American Allergy Supply–3M Filtrete Vacuum Filter Bags Internet Web Publication http://www.neosoft.com/users/s/sreifler/3mbagidx.htm Copyright 1994–1997.

The Nonwoven Fabrics Handbook, Association of Nonwoven Fabrics Industry (1992), p. vii.

*Primary Examiner*—Richard L. Chiesa
(74) *Attorney, Agent, or Firm*—Schnader Harrison Segal & Lewis LLP

(57) ABSTRACT

A composite filter for removing particulates entrained in a gas has stack of at least two non-pre-bonded tiers of filter material which are bonded together to form a unitary stratified structure. The tiers can include thermally bindable components such as bicomponent or monocomponent polymer fibers, or adhesively bindable components, such as pulp fibers, especially fluff pulp, split film fibers, mixed electrostatically charged fibers and staple fibers. In addition to vacuum cleaner bags, the novel filter composite can be utilized in applications such as heating ventilation and air conditioning (HVAC) systems, vehicle cabin air filters, high efficiency (so-called "HEPA") and clean room filters, emission control bag house filters, respirators, surgical face masks and the like.

33 Claims, 15 Drawing Sheets

U.S. PATENT DOCUMENTS

| | | | |
|---|---|---|---|
| 4,917,942 A | | 4/1990 | Winters ..................... 428/286 |
| 4,925,601 A | * | 5/1990 | Vogt et al. ........... 264/DIG. 48 |
| 4,948,639 A | | 8/1990 | Brooker et al. ............. 428/35.2 |
| 5,080,702 A | | 1/1992 | Bosses ......................... 55/382 |
| 5,230,800 A | | 7/1993 | Nelson ....................... 210/496 |
| 5,244,703 A | | 9/1993 | Bosses ...................... 428/35.2 |
| 5,248,323 A | | 9/1993 | Stevenson ..................... 95/90 |
| 5,306,534 A | | 4/1994 | Bosses ...................... 428/35.2 |
| 5,419,953 A | | 5/1995 | Chapman ................... 428/284 |
| 5,437,910 A | | 8/1995 | Raabe et al. ................ 428/194 |
| 5,470,485 A | * | 11/1995 | Morweiser et al. ....... 95/273 X |
| 5,607,735 A | * | 3/1997 | Brown ................... 55/DIG. 5 |
| 5,620,785 A | * | 4/1997 | Watt et al. ........... 264/DIG. 48 |
| 5,647,881 A | | 7/1997 | Zhang et al. ................. 55/382 |
| 5,667,562 A | | 9/1997 | Midkiff ......................... 96/15 |
| 5,690,711 A | | 11/1997 | Bosses ........................ 55/380 |
| 5,730,923 A | | 3/1998 | Hassenboehler, Jr. et al. ... 264/479 |
| 5,855,784 A | | 1/1999 | Pike et al. .................. 210/505 |
| 5,979,030 A | * | 11/1999 | Legare ................... 55/DIG. 5 |
| 5,993,501 A | | 11/1999 | Cusick et al. ................. 55/486 |
| 6,045,595 A | * | 4/2000 | Freudenberg ........... 55/DIG. 2 |

* cited by examiner

HIGH EFFICIENCY DEPTH FILTER AND METHODS OF FORMING THE SAME

CROSS REFERENCE TO PRIOR APPLICATIONS

This application claims priority of Provisional Application No. 60/142,877, filed Jul. 8, 1999, titled Melt Blown and Fluff Pulp Based Depth Filter the full disclosure of which is fully incorporated herein by reference.

FIELD OF THE INVENTION

This invention relates to porous filter media for removing solid particles entrained in a moving gas stream. More specifically, it relates to a filter composite comprising a plurality of non-pre-bonded tiers of filter material assembled in preselected juxtaposition and bonded together to form a unitary stratified structure useful for filtering particulates from air.

BACKGROUND

In recent times, the technology for filtering particulates from gases has become quite sophisticated in both commonplace applications such as consumer oriented vacuum cleaning of dirt and dust as well as very demanding industrial applications such as removal from gases of specific particle size fractions of wide varieties of contaminants including from inert to biochemically sensitive, among others. It is now well appreciated that the contaminating particulates in a gas stream can have a wide variety of sizes, geometric shapes, e.g., elongated and spherical, and chemical and physical compositions, e.g., odor-free and odor-emitting particles.

Consequently, filtration technology has evolved to provide filter media which are adapted to optimally filter specific fractions of the contaminating particulates. Also, this technology has developed techniques for maximizing various performance characteristics of filters such as maintaining low pressure drop across the filter and increasing the filter service life so as to extend the length of time between filter element replacements.

The traditional approach to achieving these objectives has been to provide a multilayer filter medium composed of separate, individually designed layers which are each intended to accomplish primarily one, and sometimes several specific filter functions. For example, a very open, porous and thin scrim is often used to protect underlying filter layers from abrasion by fast moving, large and hard particles; a porous and bulky layer is typically used to capture substantial amounts of chiefly large particles, and an ultrafine diameter filament, low porosity layer is usually prescribed for removing the smallest particles to increase filtration efficiency. From the many choices available, separate filter layers are selected and combined in a preselected sequence then assembled as a group to form a multilayer, and therefore multifunctional filter. The one or more adjacent layers can be bonded to each other or the layers can be unbonded. Optionally, the individual layers can be sandwiched between covers, typically of paper, for structural integrity and ease of handling.

A drawback of the aforementioned multilayer system of constructing multifunctional filters is that there is repetitive processing of the filter media which can be excessive. That is, the filter material in a given layer is first processed to form the individual layer, then it is processed to assemble that layer in the multilayer filter. Each step adds to the compaction and cover, if ever slight, of the final filter product. This tends to raise the pressure drop through the filter and reduce dust holding capacity, thereby limiting service life. It is desirable to have a multifunctional, multicomponent filter which can be produced with a minimum of filter medium compaction and cover.

SUMMARY OF THE INVENTION

Accordingly, the present invention now provides a composite filter comprising a plurality of non-prebonded tiers each tier independently comprising at least one filtration material and being distinct from adjacent tiers, in which the plurality of tiers are bonded together to form a unitary stratified structure having a first boundary surface adapted to receive particulates entrained in air and a second boundary surface adapted to discharge filtered air.

There is also provided a novel method of making a composite filter comprising the steps of
 (a) laying down a filtration material onto a support to form a non-prebonded tier,
 (b) depositing onto the tier previously formed another filtration material having a different composition from that of the tier previously formed to form a non-prebonded overlying tier,
 (c) bonding the tiers of filtration material to form a composite filter having a unitary stratified structure.

DETAILED DESCRIPTION

Figure 1A:
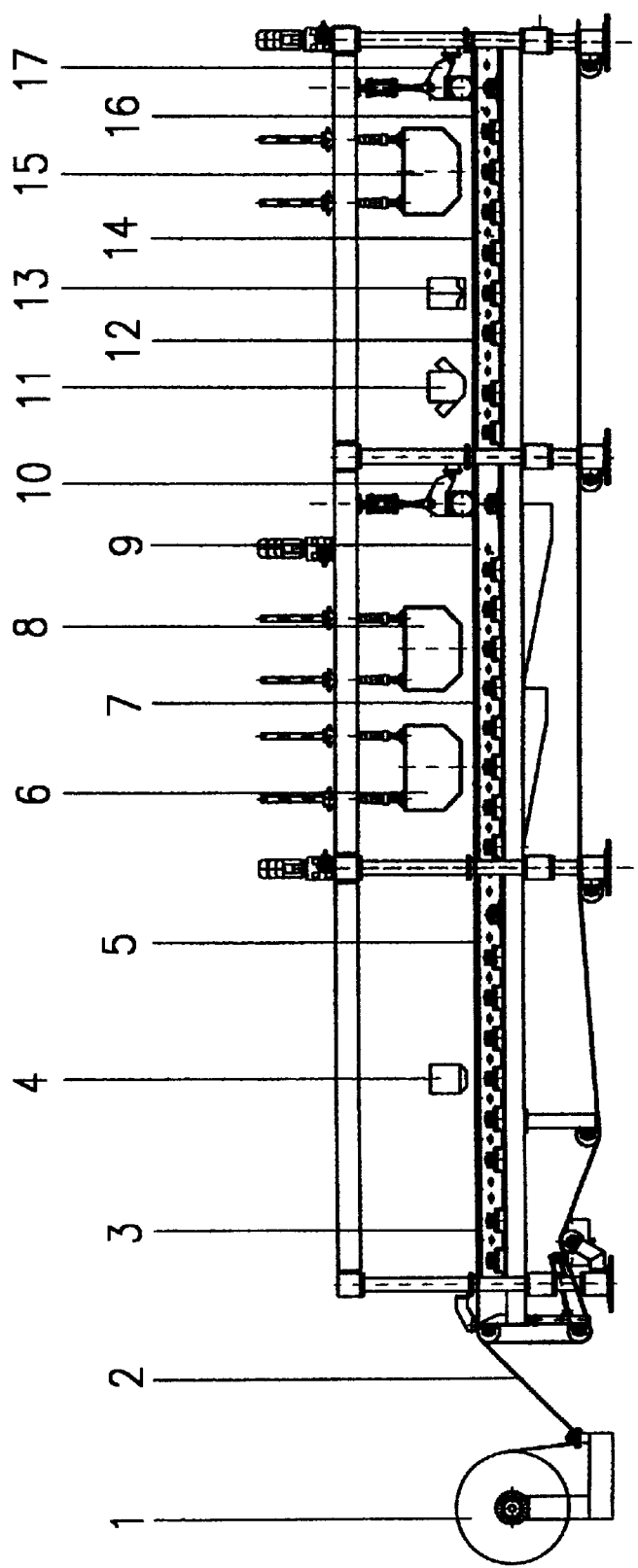
FIGS. 1a–1c is a schematic diagram of an in-line process for producing a composite filter according to a preferred embodiment of the present invention.

This invention basically provides a novel filter composite made up of a plurality of stacked tiers of filtration material bonded together to form a unitary stratified structure. The composition of filtration material in any given tier is preselected to perform a desired filtering function. For example, fine, (i.e., small diameter) and densely packed fibers can be selected to capture very small dust particles such as those of about 5 micrometers and smaller. Electrostatically charged fibers can also be used to stop passage of these and even smaller particles. Similarly, bulky, highly porous media designed to have large dust holding capacity can be utilized to trap medium to large size dirt particles.

The novel filter composite has the distinguishing characteristic that at least one and preferably all of the tiers are not pre-bonded prior to and during the stacking. The term "pre-bonded" means here that a composition of filter medium, such as thermally bondable fusing fibers or adhesively bindable fibers, is treated in a manner effective to activate the binding mechanism thereby forming a separate, free-standing, cohesive, and typically self-supporting web of that filter composition. Such a pre-bonded web can be mechanically manipulated by such processes as winding on a roll, unwinding from a roll, cutting and the like. Hence, in one aspect of this invention, the bonding of at least one and preferably all of the tiers to form the unitary structure is begun only after the stacking of all the tiers of a particular desired filter composite structure has been completed. The resulting structure is a single body composed of different types of filtration material which appear as distinct strata as viewed in cross section through the filter composite as will be further explained in the description and drawings, below.

As mentioned, the stratified structure is formed by building up a stack of tiers of selected filtration materials. Because the tiers are non-prebonded, the components of each tier, that is, fibers, granules, etc., generally are laid loosely by mechanical or air-laying processes onto the layer lying below. Within each tier the composition of filter material is largely uniform and there is a "fuzzy" interface between the tiers, such as interface 36A in FIG. 2 and represented similarly as dashed lines in FIGS. 3–13. In one aspect a single tier can be constituted of a single type of filter medium, for example, 100% bicomponent polymer fibers, melt blown, staple fibers, or spunbond filaments. In another aspect, a single tier can be constituted by a blend of media, such as an air-laid, usually uniform blend of bicomponent polymer fibers and fluff pulp (FP) fibers. Since it is desired to provide a stratified structure, it is a feature of this invention that adjacent tiers in a stack have different compositions. Nonetheless, a composition of one tier can be repeated in the stack although at least one tier of different composition should be present between the tiers of same composition.

This structure differs from that of conventional multilayer filtration media which are formed by laminating a plurality of individual filter medium layers that have each been pre-bonded to form a self-supporting web prior to formation of the multilayer laminate. The term "tier" herein means a band formed from non-prebonded filter material into a stratum of unitary stratified structure. In contrast, a "layer" means a separately, prebonded, self-supporting web of filter material.

The unitary stratified structure of the novel filter composite provides a number of significant advantages over conventional filter media. In one aspect, the unitary stratified structure can be made bulkier to provide greater dust holding capacity than a laminate of individually, pre-bonded layers having compositions corresponding respectively to the tiers of the unitary structure. This is because each portion of the conventional filter medium is compressed at least twice: once when the individual layer is formed by bonding, and a second time when the individual layers are laminated to form the filter.

In another aspect, the novel structure can have less adhesive than conventional filters. This stems from the ability to dry lay successive tiers onto the stack without using adhesive at the interfaces. Even though adhesives, such as latex adhesive, is typically applied sparingly, every additional application adds, if ever so slightly, to the coverage. Consequently, the more adhesive used, generally the higher the pressure drop across the filter and the faster that a filter can be expected to blind with dust and dirt particles.

In still another aspect, the novel structure preferably comprises one or more tiers which are each very flimsy. That is, they have such high porosity or have such little amount of solid filter material that the tier is not self-supporting. In other words, the composition of the tier lacks sufficient structural integrity on its own to form a separate, free standing web as might be used in a conventional, multilayered laminate. Hence, the novel filter composite provides the ability to incorporate one or more individually flimsy yet highly functional tiers into the stratified composite. By virtue of its unitary structure, the composite has adequate strength, stiffness and other properties to be useful as a filter. For example, a very highly porous and therefore individually flimsy tier can be incorporated in a stack of the novel filter composite to provide high dust holding capacity even though a standalone layer of the same composition could not be fabricated for use in a conventional laminate. Similarly, a very thin, structurally weak tier of ultra fine fibers can be incorporated in a stack to produce superior fine dust filtration although the same composition might be too weak to form a layer of its own.

The flimsiness of a tier can be tested as follows. If the substance of the tier cannot be laid down on a support then wound onto a roll and unwound from the roll, the substance is said to be flimsy within the meaning of this invention.

The filter composites of this invention can be utilized in vacuum cleaner bags, and more generally in vacuum filters. By "vacuum filter" is meant a filter structure intended to operate by passing a gas, preferably air, which entrains usually dry solid particles, through the structure. The convention has been adopted in this application to refer to the sides, tiers and layers of the structure in relation to the direction of air flow. That is, the filter inlet side is "upstream" and the filter discharge side is "downstream" for example. Occasionally herein the terms "in front of" and "behind" have been used to denote relative positions of structure elements as being upstream and downstream respectively. Of course, there will be a pressure gradient, sometimes referred to as "pressure drop", across the filter during filtration. Vacuum cleaners typically use bag shaped filters. Normally, the upstream side of a vacuum bag filter is the inside and the downstream side is outside.

In addition to vacuum cleaner bags, the novel filter composite can be utilized in applications such as heating ventilation and air conditioning (HVAC) systems, vehicle cabin air filters, high efficiency (so-called "HEPA") and clean room filters, emission control bag house filters, respirators, surgical face masks and the like. Optionally, the filter composite can be used in such applications with an additional carbon fiber or particle-containing layer in series with the novel filter composite, for example to absorb odors or toxic contaminants. Moreover, certain applications, such as HEPA and clean room filters can employ additional layers in series with the novel composite, such as low porosity polytetrafluorethylene (PTFE) membrane laminated to a boundary surface of an appropriate unitary stratified structure, composite filter.

In this text the notations "x" and "^" are used to signify multiplication and exponential operation, respectively.

DIN 44956-2 test is employed to determine the increase in pressure drop of five different examples of vacuum cleaner bag constructions after dust loading with fine dust at the following levels: 0, 0.5, 1.0, 1.5, 2.0, and 2.5 grams.

Air Permeability after Fine Dust Loading Test: The dust loading part of the DIN 44956-2 is performed at 0.5 gram increments from 0 to 2.5 g/(m^2×s) on seven bags of each sample. However, the pressure drop values are not recorded again. The maximum sustainable air permeability values are then determined on the bags, which had the specified levels of dust loading.

Filter material compositions which are referred to in this patent application are described in greater detail as follows:

Standard Vacuum Cleaner Filter Bag Material:

This material, sometimes referred to as "standard paper" has traditionally been used as a single ply in which it provides dust filtration and containment, as well as the strength and abrasion resistance required of a vacuum cleaner bag. This material is also rigid enough to enable easy fabrication on standard bag manufacturing equipment. The paper is predominantly composed of unbleached wood pulp with 6–7% of a synthetic fiber such as poly[ethylene terephthalate] (PET) type polyester, and is produced by the wet laying process. The standard paper typically has a basis weight of about 30–80 g/m^2 and commonly about 50 g/m^2. The PET fibers typically have a fineness of 1.7 dtex and lengths of 6–10 mm. This paper has air permeability in the range of about 200–500 L/(m^2×s) and an average pore size of about 30 mm. However, the efficiency as determined from the DIN 44956-2 Test is only about 86%. Another characteristic is that the pores are quickly clogged with dust and the dust holding capacity is further limited by the very thin paper thickness of only about 0.20 mm.

Spunbond Nonwoven

A nonwoven of spunbond polymer fibers can be deployed as a filtration tier in the structure. The fibers can be of any spunbond-capable polymer such as polyamides, polyesters or polyolefins. Basis weight of the spunbond nonwoven should be about 10–100 g/m^2 and preferably about 30–40 g/m^2. The spunbond nonwoven should have an air permeability of about 500–10,000 L/(m^2×s), and preferably about 2,000–6,000 L/(m^2×s) as measured by DIN 53887. The spunbond can also be electrostatically charged.

Scrim or Supporting Fleece

Scrim refers to a generally light basis weight, very open porous paper or nonwoven web. Basis weight of the scrim is typically about 10–30 g/m^2, and frequently about 13–17 g/m^2. The scrim, sometimes refer to as a supporting fleece usually has air permeability of about 500–10,000 L/(m^2×s). It is primarily employed to protect other tiers or layers from abrasion. The scrim can also filter the very largest particles. The scrim, as well as any tier of the filter composite, can be electrostatically charged provided the material has suitable dielectric properties.

Wet-laid High Dust Capacity Material:

Wet-laid High Dust Capacity material, frequently referred to herein as "wet-laid capacity paper" is bulkier, thicker and more permeable than the standard vacuum cleaner bag filter paper. It performs multiple functions. These include resisting shock loading, filtering of large dirt particles, filtering a significant portion of small dust particles, holding large amounts of particles while allowing air to flow through easily, thereby providing a low pressure drop at high particle loading which extends the life of the filter.

The wet-laid capacity paper usually comprises a fiber mixture of wood pulp fibers and synthetic fibers. It typically contains up to about 70% wood pulp and correspondingly more synthetic fiber, such as PET, than the standard paper described above. It has a greater thickness than the standard paper of about 0.32 mm at a typical basis weight of 50 g/m^2. Pore size also is much greater, in that the average pore size can be greater than 160 mm. Thus, the paper is able to hold much more dust in its pores before clogging up. Basis weight of the wet-laid capacity paper typically is about 30–150 g/m^2 and preferably about 50–80 g/m^2.

The wet-laid capacity paper has a fine dust particle filtration efficiency of about 66–67% as determined by the DIN 44956-2. Importantly, the wet-laid capacity paper has air permeability higher than the standard filter paper. The permeability lower limit thus preferably should be at least about 500 L/(m^2×s), more preferably at least about 1,000 L/(m^2×s) and most preferably at least about 2,000 L/(m^2× s). The upper limit of permeability is defined to assure that the paper filters and holds a major fraction of the dust particles larger than about 10 mm. Consequently, a secondary high efficiency filter medium positioned downstream is able to filter out and contain fine particles much longer before showing indication of a substantial pressure drop increase across the filter. Accordingly, the air permeability of the wet-laid capacity paper preferably should be at most about 8,000 L/(m^2×s), more preferably at most about 5,000 L/(m^2×s), and most preferably at most about 4,000 L/(m^2× s). It is thus seen that the wet-laid capacity paper is especially well designed as a multipurpose filtration tier to be positioned upstream of the secondary high efficiency filtration tier.

Dry-laid High Dust Capacity Material

Dry-laid high dust capacity material, sometimes referred to herein as "dry-laid capacity paper", had not been used as a filter in vacuum cleaner bags. Dry-laid paper is not formed from a water slurry, but is produced with air-laying technology and preferably by a "fluff pulp" process. Hydrogen-bonding which plays a large roll in attracting the molecular chains together does not operate in the absence of water. Thus, at the same basis weight, dry-laid capacity paper, is usually much thicker than standard paper and the wet-laid capacity paper. For a typical weight of 70 g/m^2, the thickness is 0.90 mm, for example.

The dry-laid capacity paper webs can be bonded primarily by two methods. The first method is latex bonding in which the latex binder may be applied from water-based dispersions. Saturation techniques such as spraying or dipping and squeezing (padder roll application) followed in both cases by a drying and heat curing process can be used. The latex binder may also be applied in discrete patterns such as dots diamonds, cross hatches or wavy lines by gravure roll followed by drying and curing.

The second method is thermal bonding, for example by utilizing binder fibers. Binder fibers sometimes referred to herein as "thermally bondable fusing fibers" are defined by the Nonwoven Fabric Handbook, (1992 edition) as "Fibers with lower softening points than other fibers in the web. Upon the application of heat and pressure, these act as an adhesive." These thermally bondable fusing fibers generally completely melt at locations where sufficient heat and pressure are applied for the web, thereby adhering the matrix fibers together at their cross-over points. Examples include co-polyester polymers which when heated adhere a wide range of fibrous materials.

In a preferred embodiment thermal bonding can be accomplished by adding from at least 20% preferably up to 50% of a bicomponent ("B/C") polymer fiber to the dry-laid web. Examples of B/C fibers include fibers with a core of polypropylene ("PP") and a sheath of more heat sensitive polyethylene ("PE"). The term "heat sensitive" means that thermoplastic fibers soften and become sticky or heat fusible at a temperature of 3–5 degrees C below the melting point. The sheath polymer preferably should have a melting point in the range of about 90–160 degrees C and the core polymer should have a higher melting point, preferably by at least about 5 degrees C higher than that of the sheath polymer. For example, PE melts at 121 degrees C and PP melts at 161–163 degrees C. This aids in bonding the dry-laid web when it passes between the nip of a thermal calendar or into a through-air oven by achieving thermally bonded fibers with less heat and pressure to produce a less compacted, more open and breathable structure. In a more preferred embodiment the core of the core/sheath of the B/C fiber is located eccentric of the sheath. The more that the core is located towards one side of the fiber the more likely that the B/C fiber will crimp during the thermal bonding step, and thereby increase the bulk of the dry-laid capacity. This will, of course, improve its dust holding capacity. Thus, in a still further preferred embodiment the core and sheath are located side-by-side in the B/C fiber, and bonding is achieved with a through-air oven. A thermal calendar, which would compress the web more than through-air bonding and is less preferred in this case. Other polymer combinations that may be used in core/sheath or side-by-side B/C fibers include PP with co-polyester low melting polymers, and polyester with nylon 6. The dry-laid high capacity tier can also be constituted essentially completely by bicomponent fibers. Other variations of bicomponent fibers in addition to "sheath/core", can be used, such as "side-by-side", "islands in the sea" and "orange" embodiments disclosed in Nonwoven Textiles, Jirsak, O., and Wadsworth, L. C., Carolina Academic Press, Durham, N.C., 1999, pp. 26–29, the entire disclosure of which is hereby incorporated by reference.

Generally, the average pore size of dry-laid capacity is intermediate between the pore size of the standard paper and wet-laid capacity paper The filtration efficiency as determined by the DIN 44956-2 Test is approximately 80%. Dry-laid capacity paper should have about the same basis weight and the same permeability as the wet-laid capacity paper described above, i.e., in the range of about 500–8000 L/(m^2×s), preferably about 1000–5000 L/(m^2×s) and most preferably about 2000–4000 L/(m^2×s). It has excellent dust holding capacity and has the advantage of being much more uniform in weight and thickness than the wet-laid papers.

Several preferred embodiments of dry-laid capacity paper are contemplated. One is a latex bonded fluff pulp fiber composition. That is, the fibers comprising the paper consist essentially of fluff pulp. The term "fluff pulp" means a nonwoven component of the filter of this invention which is prepared by mechanically grinding rolls of pulp, i.e., fibrous cellulose material of wood or cotton, then aerodynamically transporting the pulp to web forming components of air laying or dry forming machines. A Wiley Mill can be used to grind the pulp. So-called Dan Web or M and J machines are useful for dry forming. A fluff pulp component and the dry-laid tiers of fluff pulp are isotropic and are thus characterized by random fiber orientation in the direction of all three orthogonal dimensions. That is, they have a large portion of fibers oriented away from the plane of the nonwoven web, and particularly perpendicular to the plane, as compared to three-dimensionally anisotropic nonwoven webs. Fibers of fluff pulp utilized in this invention preferably are from about 0.5–5 mm long. The fibers are held together by a latex binder. The binder can be applied either as powder or emulsion. Binder is usually present in the dry-laid capacity paper in the range of about 10–30 wt % and preferably about 20–30 wt % binder solids based on weight of fibers.

Another preferred embodiment the dry-laid capacity paper comprises a thermally bonded blend of fluff pulp fibers and at least one of "split film fibers" and bicomponent polymer fibers. More preferably, the blend of fluff pulp fibers comprises fluff pulp fibers and bicomponent polymer fibers.

Split Film Fibers

Split film fibers are essentially flat, rectangular fibers which may be electrostatically charged before or after being incorporated into the composite structure of the invention. The thickness of the split film fibers may range from 2–100 micrometers, the width may range from 5 micrometers to 500 micrometers, and the length may range from 0.5 to 15 mm. However, the preferred dimensions of the split film fibers are a thickness of about 5 to 20 micrometers, a width of about 15 to 60 micrometers, and a length of about 0.5 to 8 mm.

The split film fibers of the invention are preferably made of a polyolefin, such as polypropylene. However, any polymer which is suitable for making fibers may be used for the split film fibers of the composite structures of the invention. Examples of suitable polymers include, but are not limited to, polyolefins like homopolymers and copolymers of polyethylene, polyterephthalates, such as poly(ethylene terephthalate) (PET), poly(butylene terephthalate) (PBT), poly(cyclohexyl-dimethylene terephthalate) (PCT), polycarbonate, and polychlorotrifluoroethylene (PCTFE). Other suitable polymers include nylons, polyamides, polystyrenes, poly-4-methylpentene-1, polymethylmethacrylates, polyurethanes, silicones, polyphenylene sulfides. The split film fibers may also comprise a mixture of homopolymers or copolymers. In the present application, the invention is exemplified with split film fibers made of polypropylene.

The use of PP polymers with various molecular weights and morphologies in laminate film structures has been shown to produce films with a proper balance of mechanical properties and brittleness required to produce split film fibers. These PP split film fibers may also be subsequently given the desired level of crimp. All dimensions of the split film fibers may, of course, be varied during manufacture of the fibers.

One method for production of the split fibers, is disclosed in U.S. Pat. No. 4,178,157, which is incorporated by reference herein. Polypropylene is melted and extruded into a film which is then blown into a large tube (balloon) into which ambient air is introduced or allowed to enter, in accordance with conventional blow stretching technology. Inflating the balloon with air serves to quench the film and to bi-axially orient the molecular structure of the PP molecular chains, resulting in greater strength. The balloon is then collapsed and the film is stretched between two or more pairs of rollers in which the film is held in the nip of two contacting rollers, with the application of varying amounts of pressure between the two contacting rollers. This results in an additional stretch in the machine direction which is accomplished by driving the second set of rollers at a faster surface speed than the first set. The result is an even greater molecular orientation to the film in the machine direction which will subsequently become the long dimension of the split film fibers.

The film may be electrostatically charged before or after it has been cooled down. Although various electrostatic charging techniques may be employed to charge the film, two methods have been found to be most preferable. The first method involves passing the film about midway in a gap of about 1.5 to 3 inches between two DC corona electrodes. Corona bars with emitter pins of metallic wire may be used in which one corona electrode has a positive DC voltage potential of about 20 to 30 kV and the opposing electrode has a negative DC voltage of about 20 to 30 kV.

The second, preferred, method utilizes the electrostatic charging technologies described in U.S. Pat. No. 5,401,446 (Wadsworth and Tsai, 1995), the full disclosure of which is hereby incorporated herein by reference, which is referred to as Tantret(tm) Technique I and Technique II, which are further described herein. It has been found that Technique II, in which the film is suspended on insulated rollers as the film passes around the inside circumference of two negatively charged metal shells with a positive corona wire of each shell, imparts the highest voltage potentials to the films. Generally, with Technique II, positive 1000 to 3000 volts or more may be imparted to on one side of the films with similar magnitudes of negative volts on the other side of the charged film. Technique I, wherein films contact a metal roller with a DC voltage of −1 to −10 kV and a wire having a DC voltage of +20 to −40 kV is placed from about 1 to 2 inches above the negatively biased roller with each side of the film being exposed in succession to this roller/wire charging configuration, results in lower voltage potentials as measured on the surfaces of the films. With Technique I, voltages of 300 to 1500 volts on the film surface with generally equal but opposite polarities on each side are typically obtained. The higher surface potentials obtained by Technique II, however, have not been found to result in better measurable filtration efficiencies of the webs made from the split film fibers. Therefore, and because it is easier to lace up and pass the film through the Technique I device, this method is now predominately used to charge the films prior to the splitting process.

The cooled and stretched film may be hot or cold electrostatically charged. The film is then simultaneously stretched and split to narrow widths, typically up to about 50 micrometers. The split, flat filaments are then gathered into a tow which is crimped in a controlled numbers of crimps per centimeter and then cut into the desired staple length.

In a particularly preferred embodiment, the dry-laid high dust capacity paper comprises a blend of all of fluff pulp fibers, bicomponent polymer fibers, and electrostatically charged split film fibers. Preferably, the fluff pulp fibers will be present at about 5–85 wt %, more preferably about 10–70 wt %, and most preferably about 40 wt %, the bicomponent fibers at about 10–60 wt %, more preferably about 10–30 wt % and most preferably about 20 wt %, and the electrostatically charged split film fibers at about 20–80 wt %, and more preferably about 40 wt %. This dry-laid high dust capacity may be thermally bonded, preferably at a high temperature of 90–160 degrees C, more preferably, at a temperature lower than 110 degrees C and most preferably at about 90 degrees C.

Mixed Electrostatic Fibers

Other preferred embodiments of the dry-laid capacity paper comprises a thermally bonded paper with 100% "mixed electrostatic fibers", a blend of 20–80% mixed electrostatic fibers and 20–80% B/C fibers, and a blend of 20–80% mixed electrostatic fibers, 10–70% fluff pulp and 10–70% B/C fibers. "Mixed electrostatic fiber" filters are made by blending fibers with widely different triboelectric properties and rubbing them against each other or against the metal parts of machines, such as wires on carding cylinders during carding. This makes one of the types of fibers more positively or negatively charged with respect to the other type of fiber, and enhances the coulombic attraction for dust particles. The production of filters with these types of mixed electrostatic fibers is taught in U.S. Pat. No. 5,470,485 and European Patent Application No. EP 02 246 811 A2.

In U.S. Pat. No. 5,470,485, the filter material consists of a blend of (I) polyolefin fibers and (II) polyacrylonitrile fibers. The fibers (I) are bicomponent PP/PE fibers of the core/sheath or side-by-side type. The fibers II are "halogen free". The (I) fibers also have some "halogen-substituted polyolefins": whereas, the acrylonitrile fibers have no halogen. The patent notes that the fibers must be thoroughly washed with nonionic detergent, with alkali, or solvent and then well rinsed before being mixed together so that they do not have any lubricants or antistatic agents. Although the patent teaches that the fiber mat produced should be needle punched, these fibers could also be cut to lengths of 5–20 mm and mixed with similar length bicomponent thermal binder fibers and also with the possible addition of fluff pulp so that dry-laid thermally bonded paper can be utilized in this invention.

EP 0 246 811 describes the triboelectric effect of rubbing two different types of fibers together. It teaches using similar types of fibers as U.S. Pat. No. 5,470,485, except that the —CN groups of the polyacrylonitrile fibers may be substituted by halogen (preferably fluorine or chlorine). After a sufficient amount of substitution of —CN by —Cl groups, the fiber may be referred to as a "modacrylic" if the copolymer comprises from 35 to 85% weight percent acrylonitrile units. EP 0 246 811 teaches that the ratio of polyolefin to substituted acrylonitrile (preferably modacrylic) may range from 30:70 to 80:20 by surface area, and more preferably from 40:60 to 70:30. Similarly, U.S. Pat. No. 5,470,485 teaches that the ratio of polyolefin to polyacrylonitrile fibers is in the range of 30:70 to 80:20, relative to a surface of the filter material. Thus, these ranges of ratios of polyolefin to acrylic or modacrylic fibers may be used in the above stated proportions in the dry-laid thermally bonded capacity paper.

Meltblown Fleece

A synthetic polymer fiber meltblown fleece can optionally be deployed as an tier between a multipurpose tier and a high efficiency filtration tier. The meltblown fleece tier increases overall filtration efficiency by capturing some particles passed by the multipurpose filtration tier. The meltblown fleece tier also optionally can be electrostatically charged to assist in filtering fine dust particles. Inclusion of a meltblown fleece tier involves an increase in pressure drop at given dust loading as compared to composites not having a meltblown fleece tier.

The meltblown fleece preferably has a basis weight of about 10–50 g/m^2 and air permeability of about 100–1500 L/(m^2×s).

High Bulk Meltblown Nonwoven

Another discovery from recent research to develop improved vacuum cleaner bags was the development of a high bulk MB web or tier which could be used upstream of a filtration grade MB fleece as a pre-filter in place of the wet-laid capacity paper or dry-laid capacity paper. The high bulk MB pre-filter can be made in a meltblowing process using chilled quench air with a temperature of about 10 degrees C. In contrast, conventional MB normally uses room air at an ambient temperature of 35–45 degrees C. Also the collecting distance from the MB die exit to the web take-up conveyer is increased to 400–600 mm in the high bulk MB process. The distance normally is about 200 mm for regular MB production. Additionally, high bulk MB nonwoven is made by using a lower temperature attenuation air temperature of about 215–235 degrees C instead of the normal attenuation air temperature of 280–290 degrees C, and a lower MB melt temperature of about 200–225 degrees C compared to 260–280 degrees C for filtration grade MB production. The colder quench air, lower attenuation air temperature, lower melt temperature and the longer collecting distance cool down the MB filaments more. Removing heat results in less draw down of the filaments, and hence, in larger fiber diameters than would be found in typical filtration grade MB webs. The cooler filaments are much less likely to thermally fuse together when deposited onto the collector. Thus, the High Bulk Meltblown nonwoven would have more open area. Even with a basis weight of 120 g/m^2, the air permeability of the High Bulk Meltblown nonwoven is 806 L/(m^2×s). By contrast, a much lighter (e.g., 22 g/m^2) filtration grade MB PP web had a maximum air permeability of only 450 L/(m^2×s). The filtration efficiency of the High Bulk MB nonwoven as determined by the DIN 44956-2 Test was 98%. When the two were put together with the High Bulk MB nonwoven on the inside of the bag, the air permeability was still 295 L/(m^2×s), and the filtration efficiency of the pair was 99.8%. The high bulk meltblown nonwoven can be uncharged, or optionally electrostatically charged provided that the nonwoven is of material having suitable dielectric properties.

High Bulk MB nonwoven of this invention should be distinguished from "filtration grade MB" which also is employed in the multitier vacuum filter structure of this disclosure. Filtration grade MB web is a conventional meltblown nonwoven generally characterized by a low basis weight typically of about 22 g/m^2, and a small pore size. Additional typical characteristics of filtration grade MB nonwoven of polypropylene are shown in Table I. A preferred high bulk MB nonwoven of polypropylene optimally includes about 5–20 wt % ethylene vinyl acetate. Filtration grade MB nonwoven has generally high dust removal efficiency, i.e., greater than about 99%.

TABLE I

| | Preferred | More Preferred | Most Preferred |
|---|---|---|---|
| Filtration Grade MB PP | | | |
| Weight g/m^2 | 5–100 | 10–50 | 25 |
| Thickness, mm | 0.10–2 | 0.10–1 | 0.26 |
| Air Permeability, L/(m^2 × s) | 100–5000 | 100–2000 | 450 |
| Tensile Strength, MD, N | 0.5–15 | 1.0–10 | 3.7 |
| Tensile Strength, CD, N | 0.5–15 | 1.0–10 | 3.2 |
| Fiber Diameter, mm | 1–15 | 1–5 | 2–3 |
| High Bulk MB PP | | | |
| Weight, g/m^2 | 30–180 | 60–120 | 80 |
| Thickness, mm | 0.3–3 | 0.5–2 | 1.4 |
| Air permeability, L/(m^2 × s) | 300–8000 | 600–3000 | 2000 |
| Tensile Strength, M.D, N | 1.0–30 | 2–20 | 10 |

TABLE I-continued

| | Preferred | More Preferred | Most Preferred |
|---|---|---|---|
| Tensile Strength CD, N | 1.0–30 | 2–20 | 9.2 |
| Fiber Diameter mm | 5–20 | 10–15 | 10–12 |

High Bulk MB nonwoven is similar in filter efficiency to dry-laid and wet-laid capacity papers mentioned above. Thus, High Bulk MB nonwoven is well-adapted to remove large quantities of large dust particles and to hold large amounts of dust. Accordingly, High Bulk MB nonwoven tier is suited for placement upstream of, and as a pre-filter for a filtration grade MB tier in a vacuum filter structure of this invention.

Spunblown (Modular) Nonwoven

A new type of meltblowing technology described in Ward, G., Nonwovens World, Summer 1998, pp. 37–40, the complete disclosure of which is incorporated herein by reference, is available to produce a Spunblown (Modular) Nonwoven suitable for use as a coarse filter tier in the present invention. Optionally, the Spunblown Nonwoven can be utilized as a filtration grade meltblown fleece tier as called for in the novel structure. Specifications of the Spunblown (Modular) Nonwoven are presented in Table II.

The process for making the Spunblown (Modular) Nonwoven is generally a meltblown procedure with a more rugged modular die and using colder attenuation air. These conditions produce a coarse meltblown web with higher strength and air permeability at comparable basis weight of conventional meltblown webs.

Microdenier Spunbond Nonwoven

A spunbond ("SB") nonwoven, occasionally referred to herein as microdenier spunbond can also be utilized in this invention in the same way as the coarse filter tier or the filtration grade meltblown fleece tier previously mentioned. Specifications of microdenier spunbond are listed in Table II. Microdenier spunbond is particularly characterized by filaments of less than 12 mm diameter which corresponds to 0.10 denier for polypropylene. In comparison, conventional SB webs for disposables typically have filament diameters which average 20 mm. Microdenier spunbond can be obtained from Reifenhauser GmbH (Reicofil III), Koby Steel, Ltd., (Kobe-Kodoshi Spunbond Technology) and Ason Engineering, Inc. (Ason Spunbond Technology).

TABLE II

| | Preferred | More Preferred | Most Preferred |
|---|---|---|---|
| Spunblown (Modular) | | | |
| Weight g/m^2 | 10–150 | 10–50 | 28 |
| Thickness, mm | 0.20–2 | 0.20–1.5 | 0.79 |
| Air permeability, L/(m^2 × s) | 200–4000 | 300–3000 | 1200 |
| Tensile Strength, MD, N | 10–60 | 15–40 | 43 |
| Tensile Strength, CD, N | 10–50 | 12–30 | 32 |
| Fiber Diameter, micrometer | 0.6–20 | 2–10 | 2–4 |
| microdenier spunbond PP (Ason, Kobe-Kodoshi, Reicofil III) | | | |
| Weight, g/m^2 | 10–50 | 20–30 | 17 |
| Thickness, mm | 0.10–0.6 | 0.15–0.5 | 0.25 |
| Air permeability, L/(m^2 × s) | 1000–10,000 | 2000–6000 | 2500 |
| Tensile Strength, MD, N. | 10–100 | 20–80 | 50 |
| Tensile Strength, CD, N | 10–80 | 10–60 | 40 |
| Fiber Diameter, micrometer | 4–18 | 6–12 | 10 |

Figure 1B:
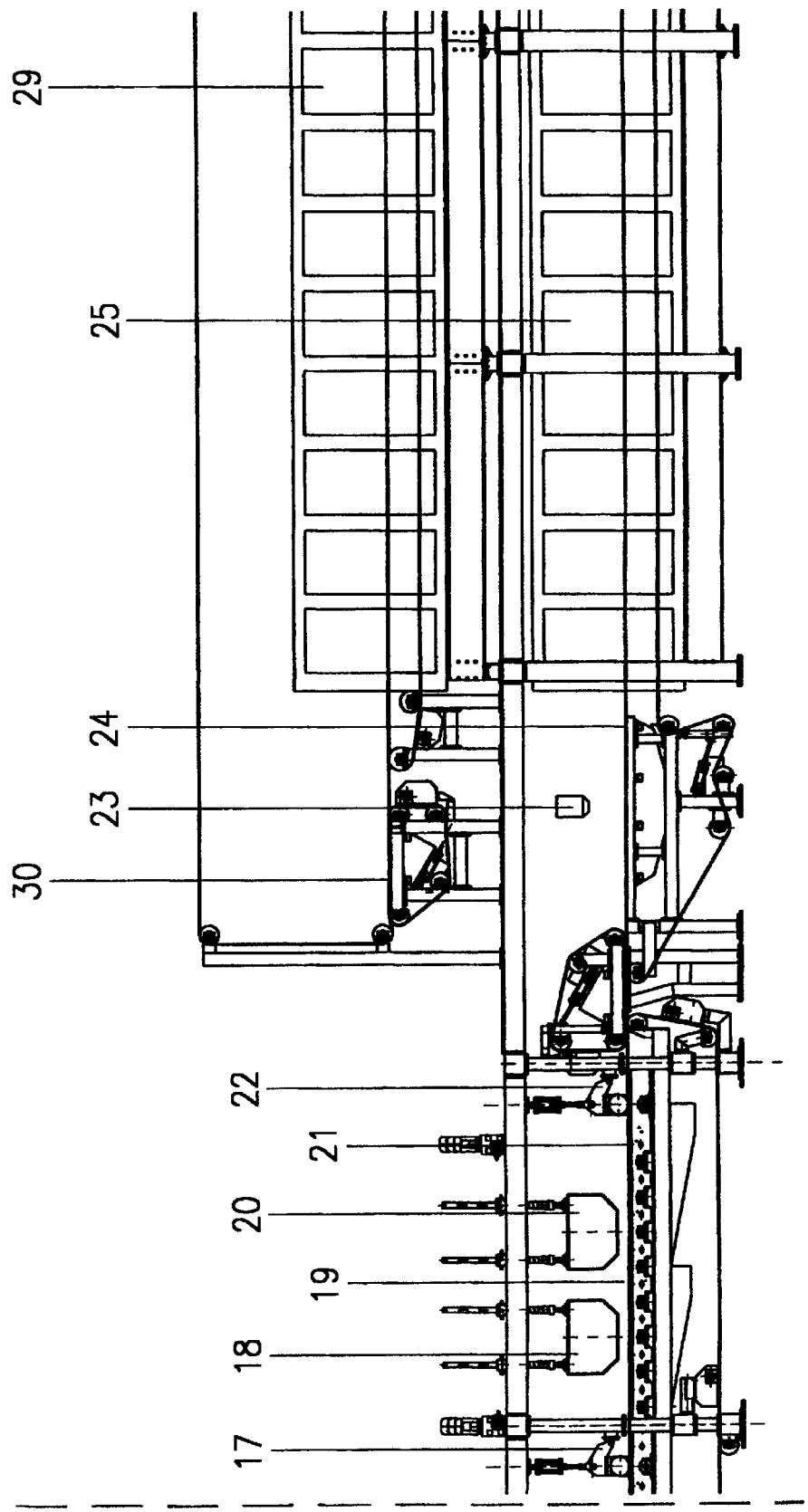
Figure 1C:
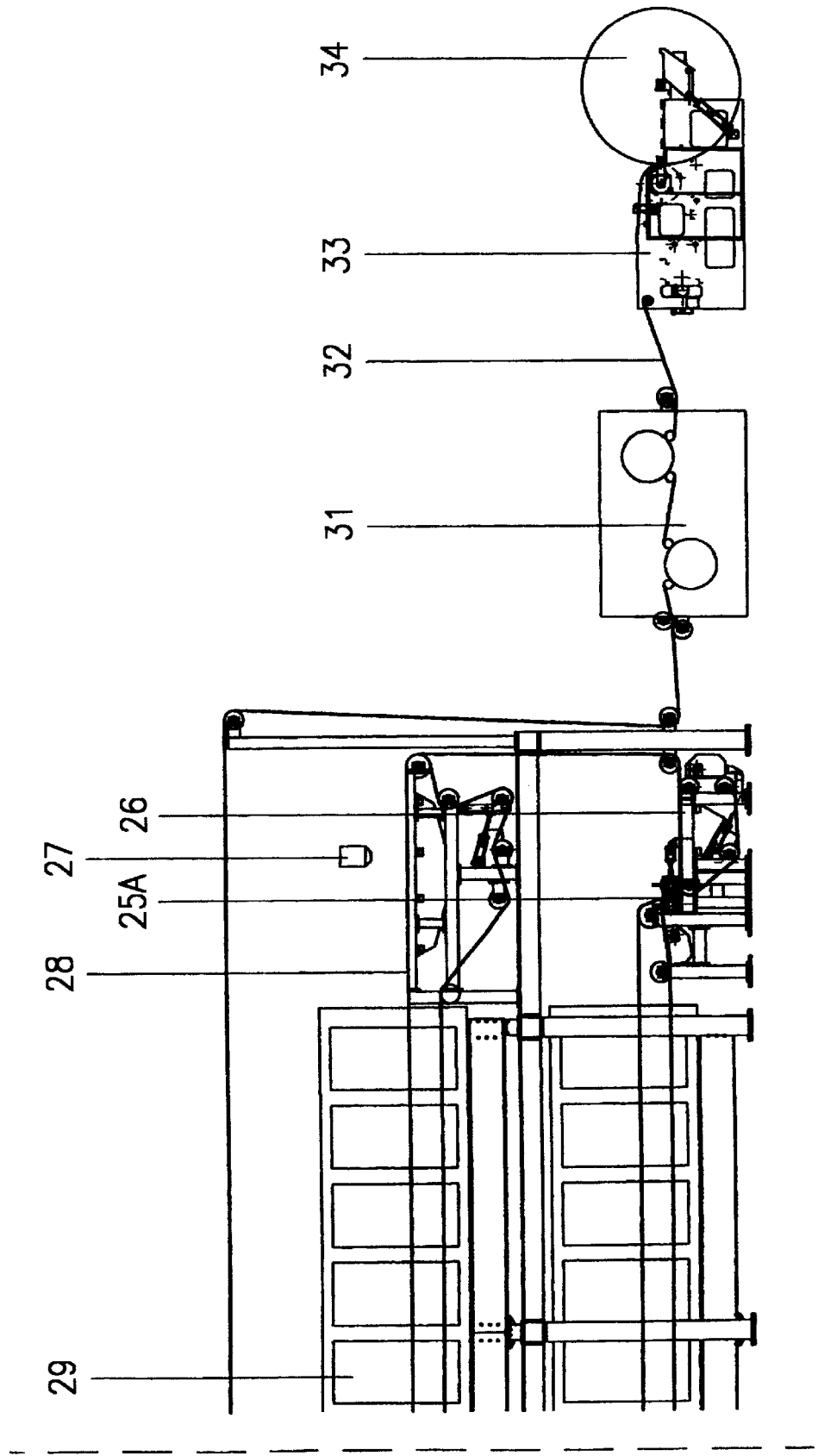

A preferred process for producing an embodiment of the novel filter composite comprising a unitary stratified structure of MB and FP compositions is shown in FIG. 1. The illustrated process provides a product laminated to a scrim, paper or nonwoven to facilitate handling, pleating or packaging. It is also possible to provide an unlaminated filter composite by replacing the scrim, paper or nonwoven with a supporting conveyor to carry the non-prebonded tiers through the process. The final unitary filter composite consists of at least two-tiers, although each tier may contain more than one type of fiber or other materials, and generally consists of three to five tiers, which are thermally or latex bonded. The electrostatic charging of the filter composite is preferably done in-line by the Tantret "cold" electrostatic charging process, although MB fibers may be "hot" charged in-line upon exiting the MB die. Also, split film fibers, which were electrostatically charged during their production, may be introduced by the FP applicators. Furthermore, "mixed electrostatic fibers" which have opposite polarities after rubbing against each other due to different triboelectric properties may be incorporated into the composite by the FP applicators.

Now referring to FIG. 1, an optional unwind 1 is located at the starting end of the line to allow for the feeding in of an optional support layer 2, which may be a scrim, paper or nonwoven. Components 1, 2, 4 and 5 are optional in that the inventive unitary filter composite is laminated to a scrim, paper or nonwoven only to facilitate handling, pleating or packaging. A conveyor belt 3 runs the entire length of the line; however it may also be separated into shorter sections with one conveyer section feeding the assembly of tiers onto the next sections as required in the process. Also at the starting end of the line there is an optional adhesive applicator 4 for dispensing an adhesive 5 in the form of glue or hot melt adhesive. This adhesive application station can be utilized when it is desired to in-line laminate a supporting layer to the unitary stratified structure of the novel composite. However, it should be noted that applicator 4 is not intended for pre-bonding tiers within the stratified structure.

Next, as shown in FIG. 1, there are at least one, and preferably two, FP applicator units 6 and 8. The primary function of the FP applicator units at the beginning of the line is to produce and deposit dry-laid tiers 7 and 9 onto the optional adhesive tier 5, or onto the conveyor belt 3 if the optional support layer 2 and adhesive 5 are not used. The dry-laid tiers 7 and 9 may be the same or have different compositions and properties to meet the requirements of the end product. In any respect, the role of tiers 7 and 9 is primarily to support and protect the MB or related filter media tiers 12 and 14. In the illustrated embodiment, the FP tiers 7 and 9 are primarily composed of "pulp" and bicomponent (B/C) fibers. Different types of B/C fibers may be used as described above. For example, a preferred type has a core of higher melting point fiber such as PP and a sheath of lower melting point fiber such as PE. Other preferred compositions of "pulp" and B/C core sheath PP/PE are 50% "pulp"/50% B/C fibers in tier 7 and 25% "pulp"/75% B/C fibers in tier 9. If latex binder is n applied in section 23, then at least 20% B/C fibers or other types of thermal binder fibers should be used. On the other hand, if latex bind is subsequently applied in sections 23 and 27, then 100% "pulp" fiber can be applied by FP applicators heads 6 and 8. Also, it is possible to apply 100% B/C fibers from FP applicator 6 or applicator 8, or from both applicator heads 6 and 8.

In additional embodiments, instead of 100% B/C fibers, monocomponent regular staple fibers of PP, PET, polyamide and other fibers can be substituted for up to 80% of the B/C or thermal bonding fibers that may be applied by any of the FP application heads 6, 8, 15, 18, and 20. Many types of thermally bondable fusing fibers which completely melt and are also known as "melt fibers" also can be used in place of the B/C fibers, except in dry-laid tier components where 100% B/C fiber would be used.

FIG. 1 further illustrates optional compactor 10 which decreases the thickness of the web and increases fiber-to-fiber adhesion of FP tiers 7 and 9. It should be noted that the extensive pre-bonding typically employed to separately produce the layers is not the objective of this optional compacting step utilized in this inventive in-line process. The compactor 10 may be a calender, which may or may not be heated. The MB or related filter media 12 and 14 may be deposited by one or more MB dies 11 and 13 onto the FP tiers 7 and 9. The primary function of the MB component is to serve as a high efficiency filter, that is, to remove small percentages of small size (less than about 5 micrometers) particles. The specifications of filtration grade MB media and related ultrafine fiber diameter types of filter media are given in Table 1.

The process can include at least one or more MB dies 11 and/or one or more related fine denier, (ultrafine fiber diameter) fiber applicators 13, designated as X. For example, if two identical MB units are utilized, then units 11 and 13 will be the same. Other variations contemplated to come within the breadth of this invention include having the first unit as a SpunBlown (Modular) or Microdenier Spunbond (SB) system first to form a filter gradient of coarser to finer high efficiency filters. Another contemplated variation is for one or more SpunBlown (Modular) or Microdenier SB systems to be used in tandem. Still another variation is to use a Microdenier SB first followed by a SpunBlown system.

The next equipment component shown in FIG. 1 is another FP applicator 15, which deposits an FP web on top of tier 14 (or on tier 12 if a second MB tier 13 is not included). Then the non-prebonded assembly of tiers with tier 16 uppermost travels through another optional compactor 17. Next the intermediate product is conveyed beneath one or more additional FP units 18 and 20. FP applicator heads 15 and 18 incorporate the Dry-Laid Capacity tier into the structure. FP applicator 20 is primarily designed to produce very open (i.e. bulky) FP primarily for dust holding capacity rather than as a filter. The very open FP tier 21 preferably is produced from 100% bicomponent B/C fiber or blends of B/C with ratios of B/C to "pulp" characterized as being higher than is normally used to produce coarse prefilter FP webs. Either or both FP tiers 16 and 19 can also contain split film fibers and "mixed electrostatic fibers". If no B/C fibers or other types of thermal bonding fibers are used in FP tiers 16 and 19, then latex binder should be applied at units 23 and 27 to bond the tiers. If B/C fibers or other types of thermal bonding fibers are incorporated in either of FP applicator heads 15 and 18, then latex binder still can also be applied at units 23 and 27.

The intermediate product with uppermost tier 21 then travels through another compactor 22 and thence through a section of the production line where the previously loose, unbound tiers are subjected to one or more binding process steps that are cumulatively effective to form the unitary stratified structure of the composite filter. Preferably, all of the filter components that will be incorporated into the unitary stratified structure are incorporated in the intermediate product at this stage prior to binding the tiers together.

With further reference to FIG. 1, it is seen that the binding steps take place beginning in the illustrated embodiment with a latex binder 24 being applied by applicator 23. The latex can be sprayed from a liquid dispersion or emulsion, applied by kiss roll or gravure application, or sprayed as a dry powder onto the substrate and then thermally fused or bonded thereto. The latex also serves as a sealant in that it minimizes dust that can emanate from outside surfaces of the FP tier. After adding latex binder at 23, the intermediate product travels through a heating unit 25 which dries and cures the latex binder to bond the composite. The heating unit can be a heated calender, or an infrared, microwave, or convection oven. A combination of these can also be used. A through-air oven is preferred. If B/C fibers or other types of thermally bondable fusing fibers are present in the intermediate product, then ovens 25 and 29 can serve to thermally fuse such fibers to continue the bonding and formation of the unitary structure.

From the oven 25, the intermediate product is cooled by system 26, and then a second latex binder is applied at 27. As illustrated, the path of travel and spraying unit 27 are positioned to apply latex binder to the side opposite the first application. The intermediate product containing the second latex binder 28 then passes through a second through-air oven 29 and through another cooling section 30. Next, the fully bonded composite film having a unitary stratified structure is charge in cold electrostatic charging station 31, preferably, a Tantret J system. Finally, the composite film 32 is slit to desired width or multiple of widths on slitter 33 and rolled up by the winder 34. Although electrostatic charging is illustrated to take place toward the end of the process, it is contemplated that charging at a stage prior to application of latex binder can be performed, provided that the binder and the subsequent procedural steps do not significantly drain the charge from the intermediate product.

Figure 2:
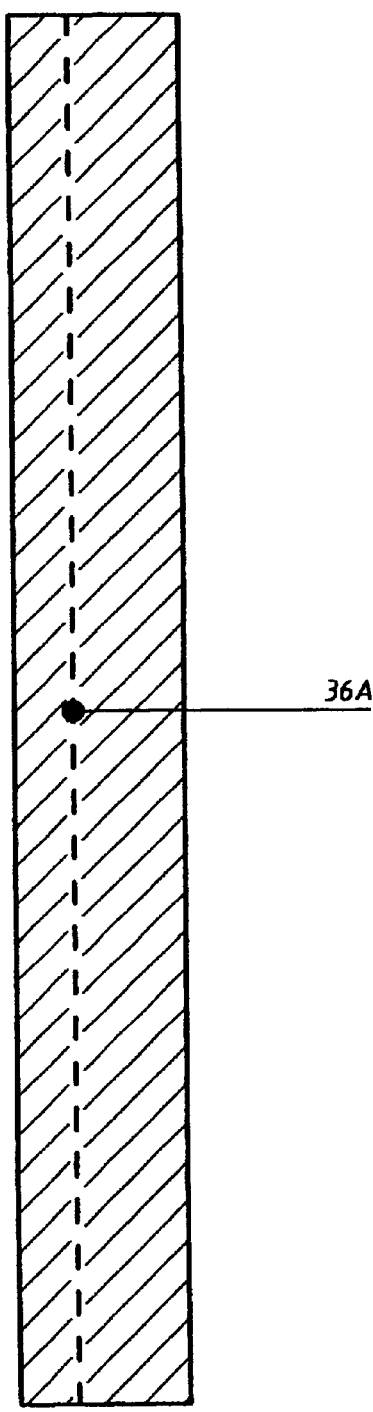
FIG. 2. is a schematic diagram showing in cross section an embodiment of the novel filter composite having a unitary stratified structure of two tiers.

Representative products according to the present invention are illustrated schematically in FIGS. 2–13, described in greater detail as follows. In the figures, air flow direction is indicated by arrow A. In FIG. 2, a unitary filter composite 36 made from two tiers is depicted. The inside (dirty air side) layer 37 is a Dry-Laid FP Capacity tier with the broadest weight of 10–150 g/m^2, typical weight range of 20–80 g/m^2 and with a preferred weight of 50 g/m^2. The FP layer 37 has different blends of pulp fibers, bicomponent (B/C) fibers split film fibers and "mixed electrostatic fibers." Split film fibers and "mixed electrostatic fibers" are not used in all variations of tier 37, but at least 10% and preferably at least 20% B/C fibers or other types of thermally bondable flusing fibers should be used to achieve adequate thermal bonding. Generally, at least 10% and preferably at least 20% pulp fibers are used for enhanced cover and filtration efficiency. The tier can be free of B/C fibers or other types of thermally bondable fusing fibers if latex binder is used. The outer tier 38 is a high efficiency MB component with a weight of 5–100 g/m^2. Notably, the independently composed tiers 37 and 38 meet at interface 36A. This interface is different from that in a laminate of two pre-bonded layers in a multilayer composite. Due to the fact that formation of a pre-bonded layer is not needed to produce the unitary structure 36, at least one of tiers 37 and 38 can be sufficiently flimsy that it could not be formed into a free standing web to be incorporated as a layer in a conventional multilayer composite.

Figure 3:
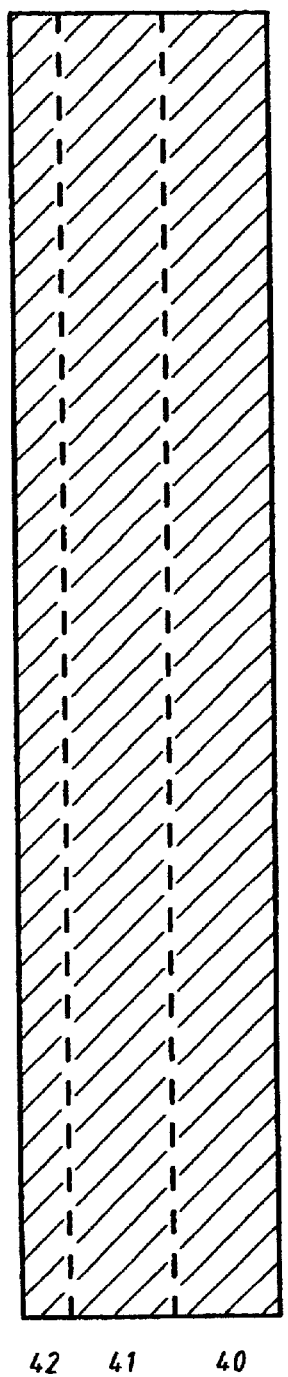
FIG. 3. is a schematic diagram showing in cross section another embodiment of the novel filter composite having a unitary stratified structure of three tiers.

FIG. 3 depicts a unitary filter composite 39 composed of three tiers. The inside layer 40 is a coarse dry-laid component made of 100% B/C fibers. It mainly serves as a pre-filter and protects downstream filter material. The broadest weight range is 10–100 g/m^2 with a typical weight range of 20–80 g/m^2, and a preferred weight of 50 g/m^2. The middle tier 41 is a Dry-Laid FP Capacity component with the broadest weight range of 10–150 g/m^2, typical weight range of 30–80 g/m^2, and a preferred weight of 50 g/m^2. Tier 41 typically has at least 10% and preferably at least 20% B/C fibers, 10% and preferably at least 20% FP and may also contain split film fibers and "mixed electrostatic fibers." At least 10% and preferably at least 20% B/C fibers or other types of thermally bondable fusing fibers should be used to achieve adequate thermal bonding. Generally, at least 10% and preferably at least 20% pulp fibers are used for enhanced cover and filtration efficiency. The tier can be free of B/C fibers or other types of thermally bondable fusing fibers if latex binder is used. The outside tier 42 consists of high filtration efficiency MB media or other ultrafine fiber diameter materials such as SpunBlown Modular or Microdenier Spunbond.

Figure 4:
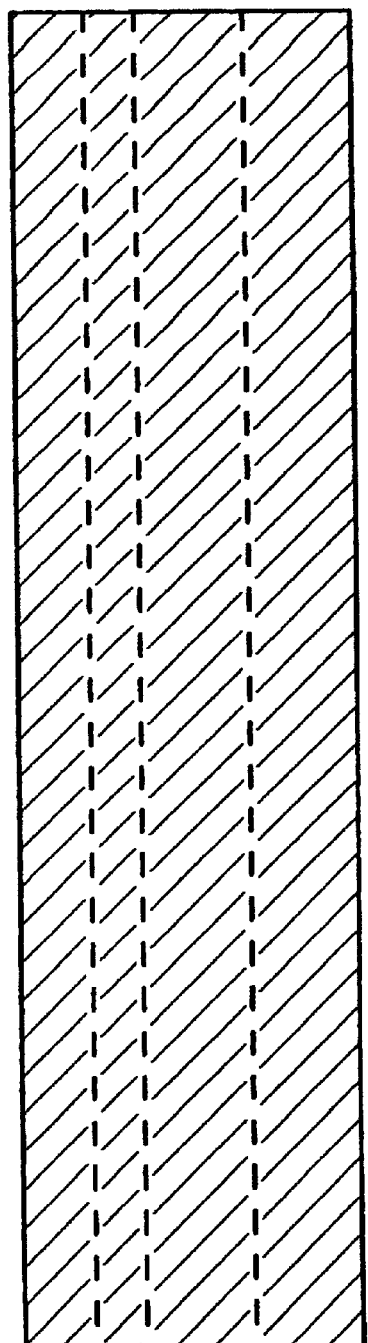
FIG. 4. is a schematic diagram showing in cross section another embodiment of the novel filter composite having a unitary stratified structure of four tiers.

FIG. 4 is a diagram of a unitary composite filter 43 made from four tiers of material. The inside tier 44 is composed of Dry-Laid FP of 100% B/C fibers. The broadest weight range is from 10–100 g/m^2, typical weight is from 20–80 g/m^2 and the target weight is 50 g/m^2. The second tier 45 is a Dry-Laid FP Capacity tier with the broadest weight range of 10–150 g/m^2, typical weight range of 30–80 g/m^2 and a preferred weight of 50 g/m^2. Layer 45 contains at least 10% and preferably at least 20% B/C fibers, 10% and preferably at least 20% pulp fibers, and may contain varying amounts of charged or uncharged split film fibers. It may contain varying amounts of "mixed electrostatic fibers". At least 10% and preferably at least 20% B/C fibers or other types of thermally bondable fusing fibers should be used to achieve adequate thermal bonding. Generally, at least 10% and preferably at least 20% pulp fibers are used for enhanced cover and filtration efficiency. The tier can be free of B/C fibers or other types of thermally bondable fusing fibers if latex binder is used. The third tier 46 contains MB filter media with a broadest weight range of 5–100 g/m^2, typical weight of 10–50 g/m^2 and a preferred weight of 25 g/m^2. The outer tier 47 is a Dry-Laid FP composed of air-laid pulp and B/C fibers.

Figure 5:
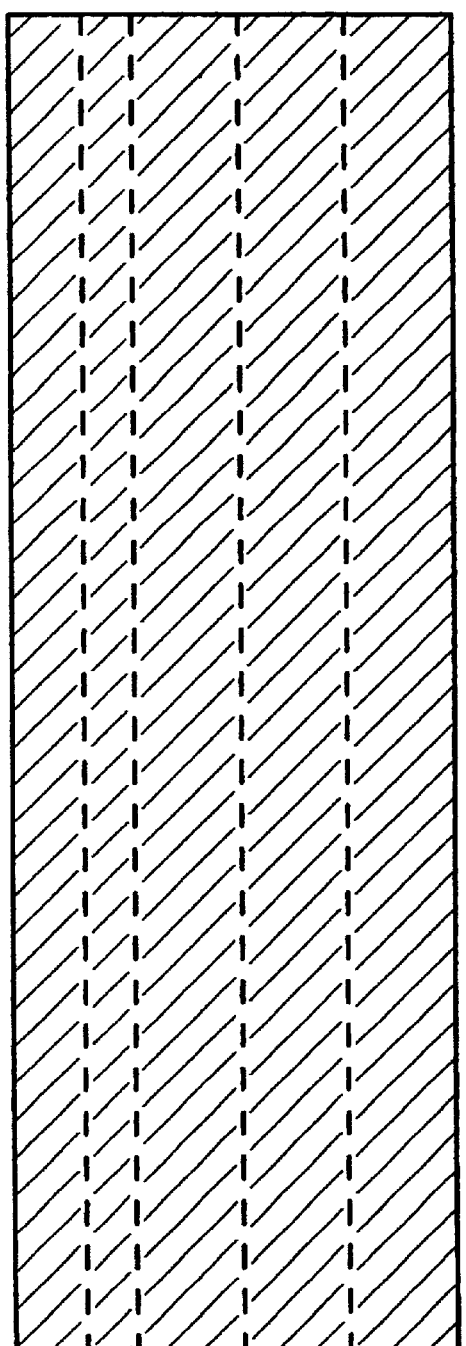
FIG. 5. is a schematic diagram showing in cross section another embodiment of the novel filter composite having a unitary stratified structure of five tiers.

FIG. 5 is a diagram of a unitary composite filter 48 made from five tiers of material. The inside tier 49 is composed of Dry-Laid FP of 100% B/C fibers. The broadest weight range is from 10–100 g/m^2, typical weight is from 20–80 g/m^2 and the target weight is 50 g/m^2. The second tier 50 is a Dry-Laid FP Capacity component with the broadest weight range of 10–150 g/m^2, typical weight range of 30–80 g/m^2 and a preferred weight of 50 g/m^2. Component 50 contains at least 10% and preferably at least 20% B/C fibers, at least 10% and preferably at least 20% pulp fibers, and may contain varying amounts of charged or uncharged split film fibers. At least at least 10% and preferably at least 20% B/C fibers or other types of thermally bondable fusing fibers should be used to achieve adequate thermal bonding. Generally, at least at least 10% and preferably at least 20% pulp fibers are used for enhanced cover and filtration efficiency. The tier can be free of B/C fibers or other types of thermally bondable fusing fibers if latex binder is used. Component 51 contains carbon granules or carbon fibers to absorb odors and to remove pollutant and toxic gases from the air. Component 52 is a high filtration efficiency MB media with a broadest weight range of 5–100 g/m^2, typical weight of 10–50 g/m^2 and a preferred weight of 25 g/m^2. Component 53 is a Dry-Laid FP composed of air-laid pulp and B,°C. fibers.

Figure 6:
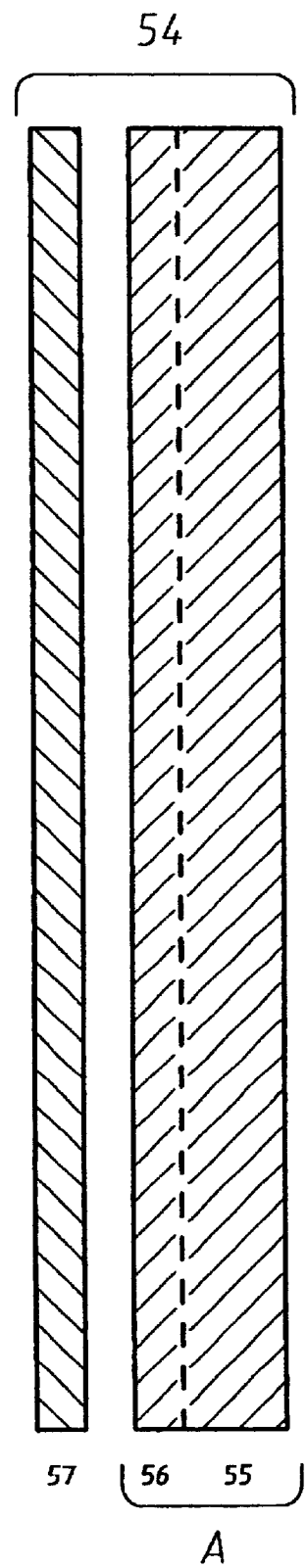
FIG. 6. is a schematic diagram showing in cross section another embodiment of the novel two-tiered filter composite of FIG. 2 in combination with a filter layer adjacent thereto.

FIG. 6 depicts a unitary filter composite 54 of the same construction as shown in FIG. 2, composed of two tiers 55, 56, bonded to a supporting outer layer 57 consisting of a paper, scrim or nonwoven with a weight ranging from 10–100 g/m^2.

Figure 7:
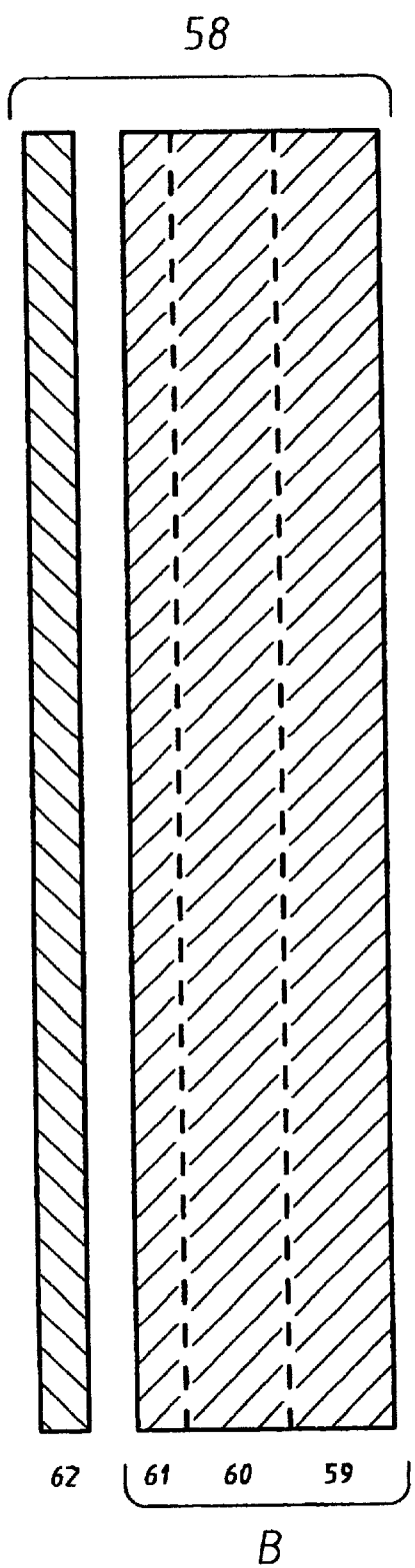
FIG. 7. is a schematic diagram showing in cross section another embodiment of the novel three-tiered filter composite of FIG. 3 in combination with a filter layer adjacent thereto.

FIG. 7 depicts a unitary filter composite 58 of the same construction as shown in FIG. 3, composed of three tiers 59, 60 and 61, to an outer layer 62 consisting of a paper, scrim or nonwoven with a weight ranging from 10–100 g/m^2.

Figure 8:
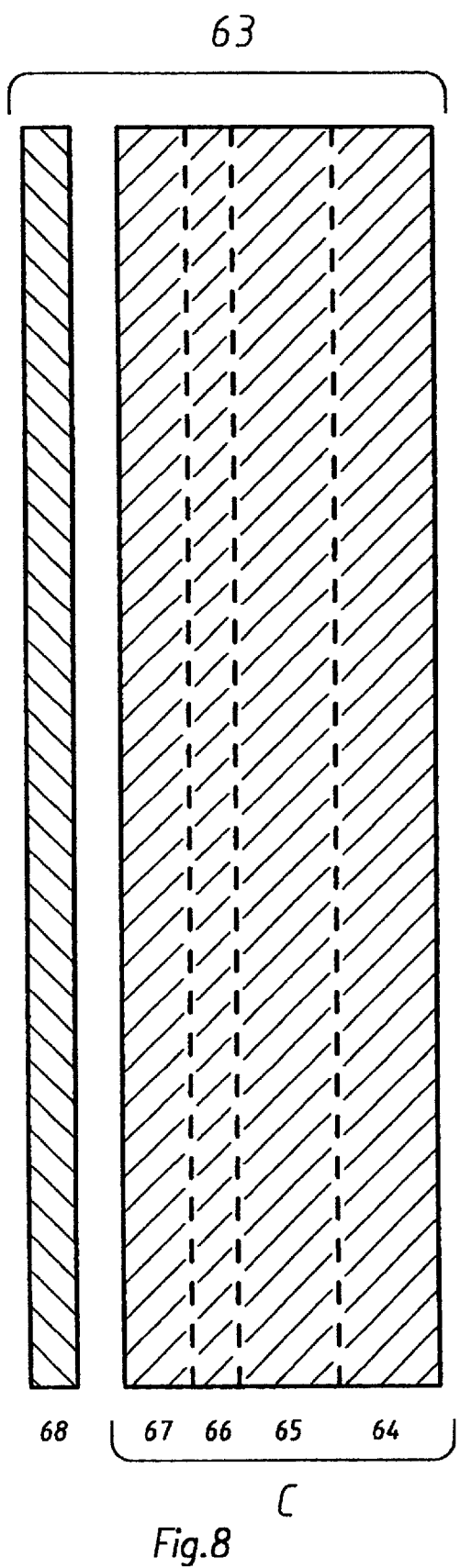
FIG. 8. is a schematic diagram showing in cross section another embodiment of the novel four-tiered filter composite of FIG. 4 in combination with a filter layer adjacent thereto.

FIG. 8 depicts a unitary filter composite 63 of the same construction as FIG. 4, composed of four tiers 64–67, to an outer layer 68 consisting of a paper, scrim or nonwoven with a weight of 10–100 g/m^2.

Figure 9:
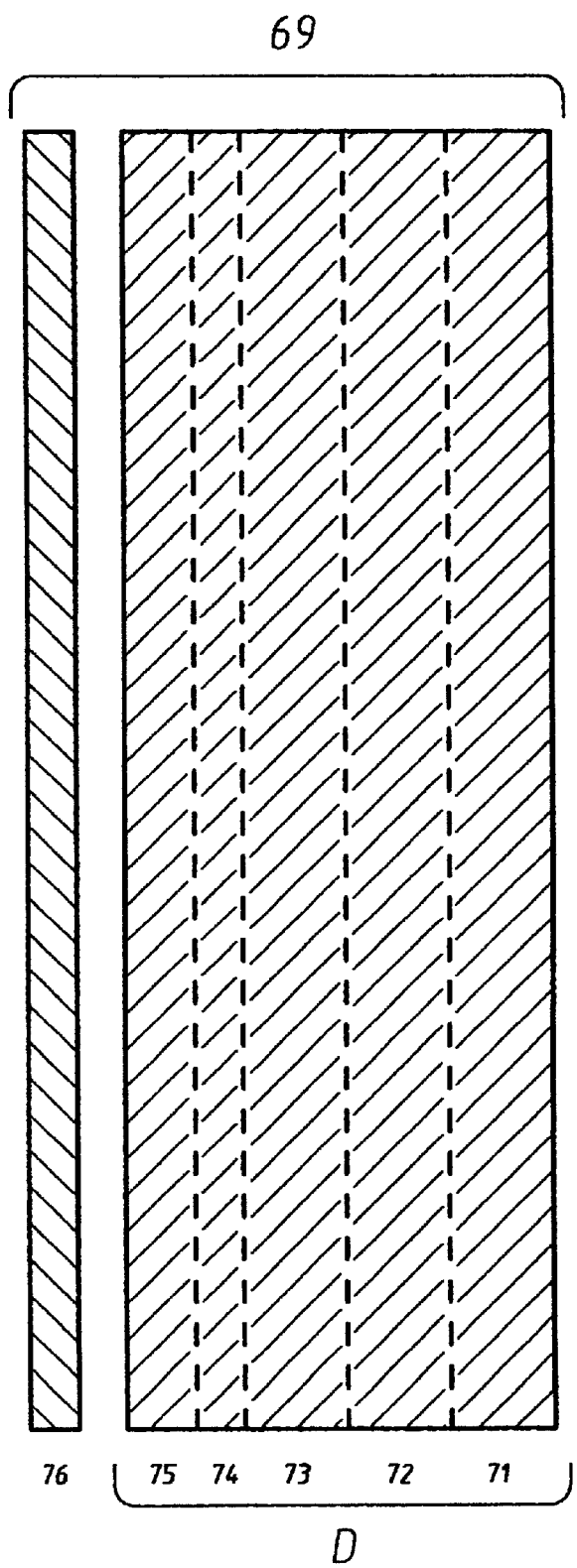
FIG. 9. is a schematic diagram showing in cross section another embodiment of the novel five-tiered filter composite of FIG. 5 in combination with a filter layer adjacent thereto.

FIG. 9 depicts a unitary filter composite 69 of the same construction as FIG. 5, composed of five tiers 71–75, to an outer layer 76 consisting of a paper, scrim or nonwoven with a weight of 10–100 g/m^2.

Figure 10:
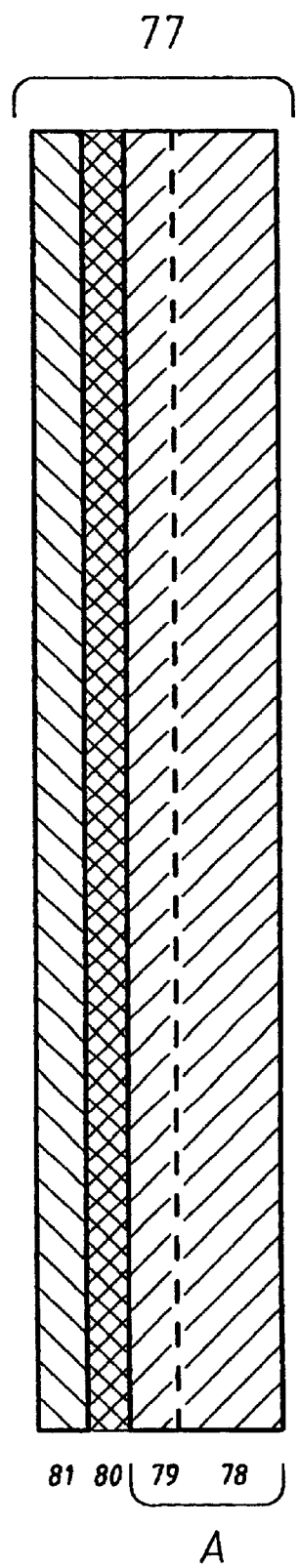
FIG. 10. is a schematic cross section diagram showing the two-tiered filter composite of FIG. 6 bonded to an adjacent filter layer with an adhesive or ultrasonically bonded layer.

FIG. 10 depicts a laminate of unitary filter composite 77 of the same construction as shown in FIG. 2, composed of two tiers 78, 79, bonded to a supporting outer layer 81 consisting of a paper, scrim or nonwoven with a weight ranging from 10–100 g/m^2, except that the outer layer is bonded by glue or an adhesive 80, in which the latter could be a latex binder or a hot melt adhesive.

Figure 11:
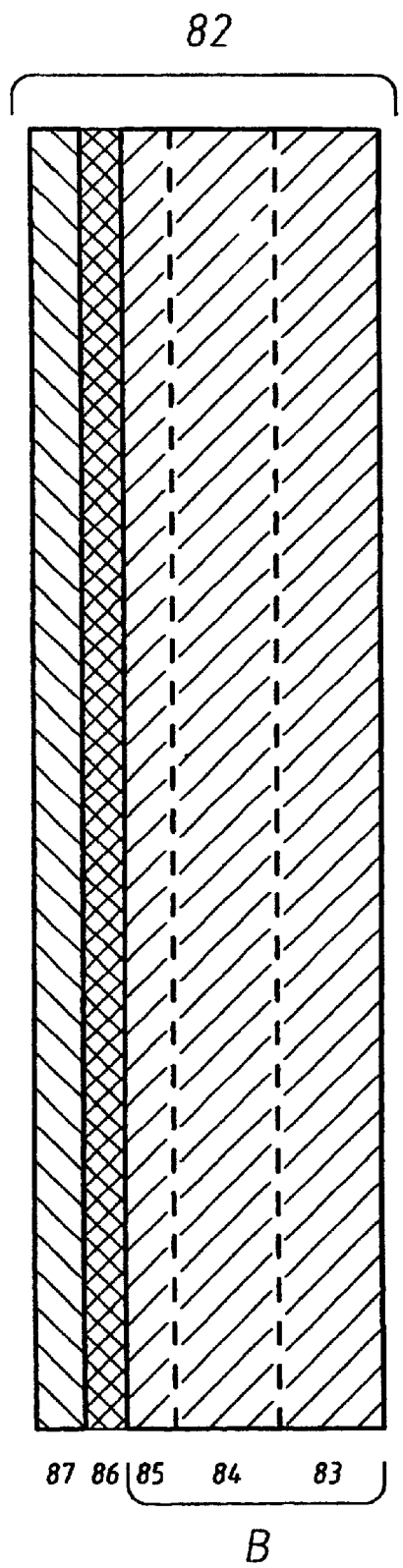
FIG. 11. is a schematic cross section diagram showing the three-tiered filter composite of FIG. 7 bonded to an adjacent filter layer with an adhesive or ultrasonically bonded layer.

FIG. 11 depicts a laminate of unitary filter composite 82 of the same construction as shown in FIG. 3, composed of three tiers 83–85, to an outer layer 87 consisting of a paper, scrim or nonwoven with a weight ranging from 10–100 g/m^2, except the outer layer is bonded by glue or an adhesive 86.

Figure 12:
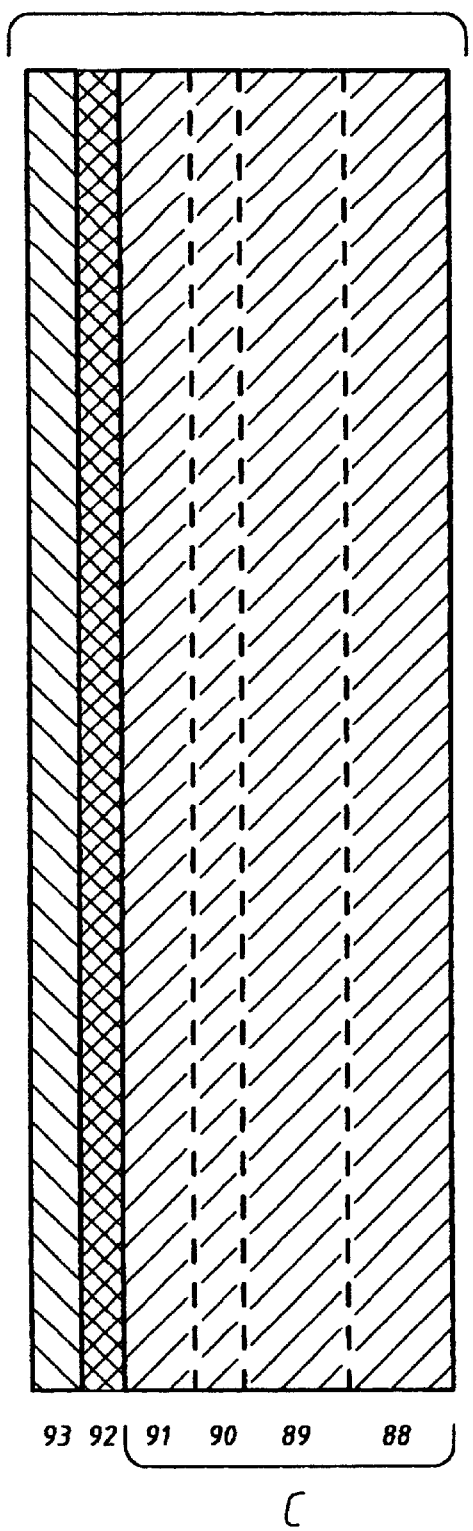
FIG. 12. is a schematic cross section diagram showing the four-tiered filter composite of FIG. 8 bonded to an adjacent filter layer with an adhesive or ultrasonically bonded layer.

FIG. 12 depicts a laminate of unitary filter composite 87A of the same construction as FIG. 4, composed of four tiers 88–91, to an outer layer 93 consisting of a paper, scrim or nonwoven with a weight of 10–100 g/m^2, except the outer layer is bonded by glue or an adhesive 92.

Figure 13:
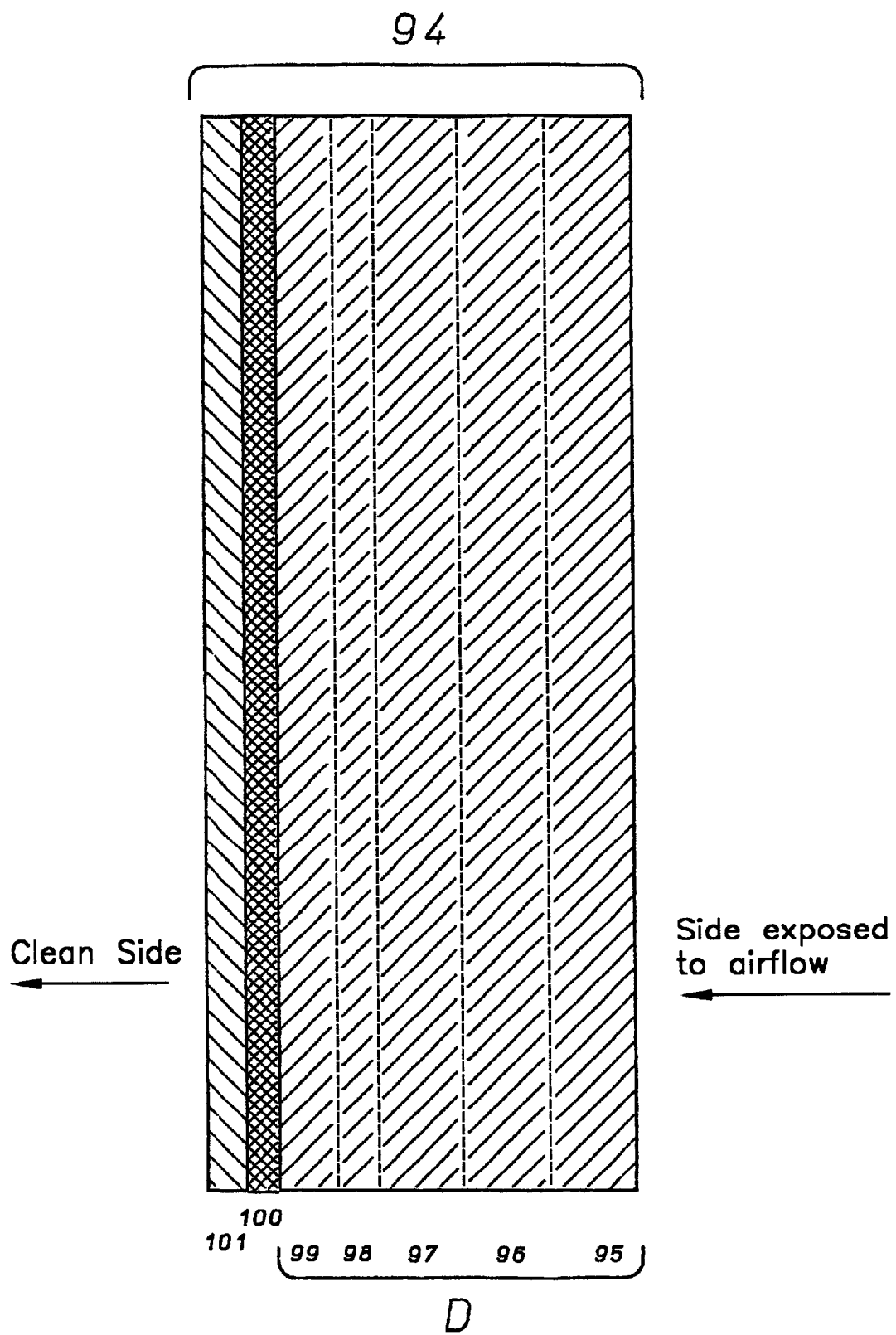
FIG. 13. is a schematic cross section diagram showing the five-tiered filter composite of FIG. 9 bonded to an adjacent filter layer with an adhesive or ultrasonically bonded layer.

FIG. 13 depicts a laminate of unitary filter composite 94 of the same construction as FIG. 5, composed of five tiers 95–99, to an outer layer 101 consisting of a paper, scrim or nonwoven with a weight of 10–100 g/m^2, except the outer layer is bonded by glue or an adhesive 100.

Where bonding between layers is indicated in embodiments of FIGS. 10–13, conventional interlayer bonding methods, such as ultrasonic bonding can be used in place of or in conjunction with glue/adhesive bonding mentioned above.

What is claimed is:

1. A composite filter comprising a plurality of non-prebonded tiers such that each tier, itself, is not a completed fabric; wherein each tier independently comprises at least one filtration material and being distinct from adjacent tiers, in which the plurality of tiers are bonded together to form a unitary stratified structure wherein each tier has a different composition to form distinct stratum from each adjacent tier with intermingling at the interface of adjacent tiers, said filter having a first boundary surface adapted to receive particulates entrained in air and a second boundary surface adapted to discharge filtered air.

2. The composite filter of claim 1 in which at least one tier is non-self-supporting.

3. The composite filter of claim 2 in which all non-self-supporting tiers each individually lack integrity effective to be laid down, rolled up and unrolled as a single entity.

4. The composite filter of claim 1 comprising 2–5 tiers.

5. The composite filter of claim 4 in which the tiers are juxtaposed to each other in order of decreasing porosity such that the tier having highest porosity is adjacent the first boundary surface and the tier having lowest porosity is adjacent the second boundary surface.

6. The composite filter of claim 5 in which the tiers each have a characteristic dust holding capacity and are juxtaposed to each other in order of decreasing dust holding capacity such that the tier having highest dust holding capacity is adjacent the first boundary surface and the tier having lowest dust holding capacity is adjacent the second boundary surface.

7. The composite filter of claim 1 in which a first tier comprises dry-laid, thermally bondable fusing, bicomponent or monocomponent polymer fibers and in which a second tier comprises meltblown fibers and in which the first tier is positioned closer to the first boundary surface than the second tier.

8. The composite filter of claim 7 in which the first tier has a composition selected from the group consisting of 100 wt. % bicomponent polymer fibers, a blend of at least about 10 wt % bicomponent polymer fibers with a complementary amount of fluff pulp fibers, staple fibers or a mixture thereof, and a blend of at least about 10 wt % monocomponent polymer thermally bondable fusing fibers with a complementary amount of fluff pulp fibers, staple fibers or a mixture thereof.

9. The composite filter of claim 8 in which the bicomponent polymer fibers have a sheath of one polymer and a core of a different polymer having a melting point higher than the one polymer.

10. The composite filter of claim 9 in which the core is polypropylene and the sheath is polyethylene.

11. The composite filter of claim 9 in which the core is disposed eccentric relative to the sheath.

12. The composite filter of claim 7 in which the first tier further comprises fibers selected from at least one of uncharged split film fibers, charged split film fibers and mixed electrostatic fibers.

13. The composite filter of claim 7 further comprising a prefilter tier positioned closer to the first boundary surface than said first tier and which consists essentially of dry-laid, bicomponent polymer fibers having a sheath of one polymer and a core of a different polymer having a melting point higher than the one polymer, and in which the second tier comprises a web selected from the group consisting of filtration grade meltblown fleece, SpunBlown Modular and microdenier spunbond.

14. The composite filter of claim 13 further comprising a backing tier positioned closer to the second boundary surface than said second tier and comprising a dry-laid blend of bicomponent polymer fibers and fluff pulp fibers.

15. The composite filter of claim 14 further comprising an odor absorbing tier positioned between the first tier and the second tier and which comprises an odor absorbing agent.

16. The composite filter of claim 15 in which the odor absorbing tier comprises a dry-laid blend bicomponent polymer fibers with either carbon granules or carbon fibers.

17. A vacuum cleaner bag comprising a filter element for filtering dirty air containing particulate contamination, and an air inlet means on the filter element for directing the dirty air into the filter element in which the filter element comprises a plurality of non-prebonded tiers such that each tier, itself, is not a completed fabric; wherein each of at least one fibrous material, the plurality of tiers being bonded together to form a unitary stratified structure adapted to filter the dirty air wherein each tier has a substantially different composition to form distinct stratum from each adjacent tier with intermingling at the interface of adjacent tiers.

18. The vacuum cleaner bag of claim 17 in which at least one tier is non-self-supporting.

19. A method of making a composite filter comprising the steps of
(a) laying down a filtration material onto a support to form a non-prebonded tier such that a completed fabric is not formed,
(b) depositing onto the tier previously formed another filtration material having a different composition from that of the tier previously formed to form a non-prebonded overlying tier such that said overlying tier, itself, is not a completed fabric, to form a distinct stratum from each adjacent tier with intermingling at the interface of adjacent tiers, (c) bonding the tiers of filtration material to form a composite filter having a unitary stratified structure.

20. The method of claim 19 which further comprises repeating the depositing step a plurality of times effective to build up a stack of tiers each having a composition adapted to achieve a preselected filtration function.

21. The method of claim 20 in which bonding of the non-prebonded tiers is commenced only after all the tiers of the stack are built up.

22. The method of claim 20 in which at least one of the laying down and depositing steps further comprises placing only sufficient filtration material to provide at least one tier which is non-self supporting.

23. The method of claim 22 in which all non-self-supporting tiers each individually lack integrity effective to be laid down, rolled up and unrolled as a single entity.

24. The method of claim 20 in which the depositing step is repeated from 1 to 3 times to build up a stack of 3 to 5 tiers.

25. The method of claim 20 in which the filtration material selected for any tier comprises thermally bondable fusing fibers, adhesively bindable fibers or a blend thereof.

26. The method of claim 25 in which the thermally bondable fusing fibers comprise bicomponent polymer fibers, monocomponent polymer fibers or a blend thereof.

27. The method of claim 25 in which the filtration material selected for any tier further comprises split film fibers, mixed electrostatic fibers, or a blend thereof.

28. The method of claim 20 in which the filtration material is selected for each tier so that porosity as measured in successive tiers of the stack either only increases or only decreases.

29. A filter composite produced by the method of claim 19.

30. A vacuum cleaner bag comprising a filter composite of claim 29.

31. A filter composite produced by the method of claim 20.

32. A vacuum cleaner bag comprising a filter composite of claim 31.

33. A composite filter comprising:

a plurality of non-prebonded tiers each tier independently comprising at least one filtration material and being distinct from adjacent tiers, in which the plurality of tiers are bonded together to form a unitary stratified structure having a first boundary surface adapted to receive particulates entrained in air and a second boundary surface adapted to discharge filtered air;

wherein a first tier comprises dry-laid, thermally bondable fusing, bicomponent or monocomponent polymer fibers and in which a second tier comprises meltblown fibers and in which the first tier is positioned closer to the first boundary surface than the second tier;

wherein a prefilter tier is positioned closer to the first boundary surface than said first tier and which consists essentially of dry-laid, bicomponent polymer fibers having a sheath of one polymer and a core of a different polymer having a melting point higher than the one polymer, and in which the second tier comprises a web selected from the group consisting of filtration grade meltblown fleece, SpunBlown Modular and microdenier spunbond;

wherein a backing tier is positioned closer to the second boundary surface than said second tier and comprising a dry-laid blend of bicomponent polymer fibers and fluff pulp fibers;

wherein an odor absorbing tier is positioned between the first tier and the second tier and which comprises an odor absorbing agent;

wherein the odor absorbing tier comprises a dry-laid blend of bicomponent polymer fibers with either carbon granules or carbon fibers.

* * * * *

Disclaimer

6,372,004 B1-Schultink et al., Eskel, (BE). HIGH EFFICIENCY DEPTH FILTER AND METHODS OF FORMING THE SAME. Patent dated Apr. 16, 2002. Disclaimer filed May 4, 2007, by the inventor.

Hereby enters this disclaimer to claims 1-33 of said patent.
*(Official Gazette February 19, 2008)*